March 14, 1944.  W. O. SCHULTZ  2,344,113
SWITCH
Filed Jan. 27, 1941  6 Sheets-Sheet 1
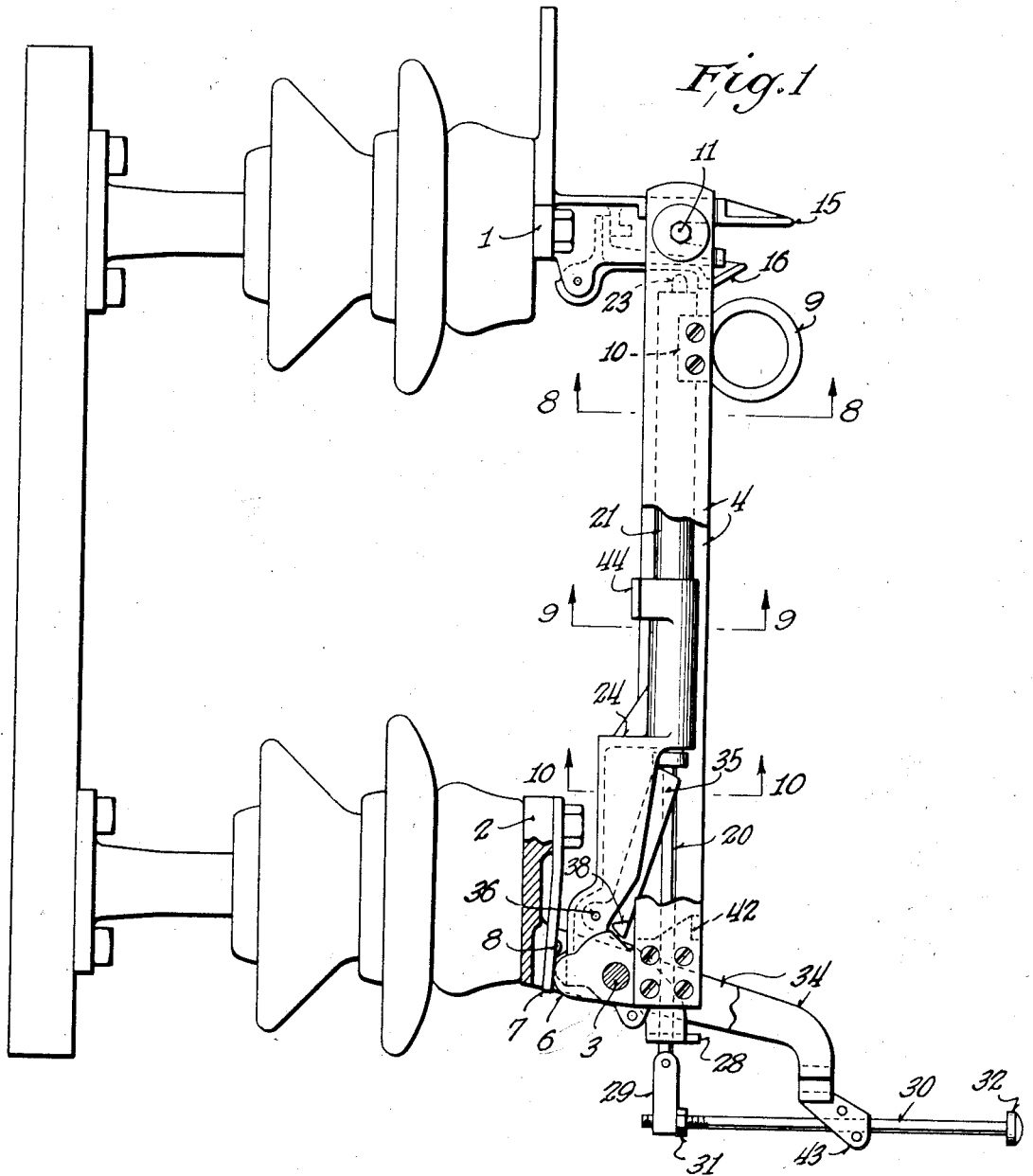
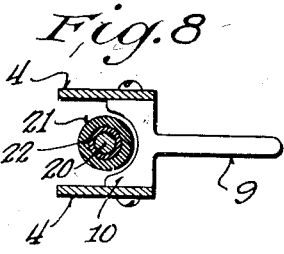
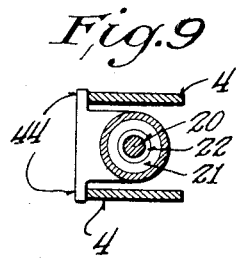
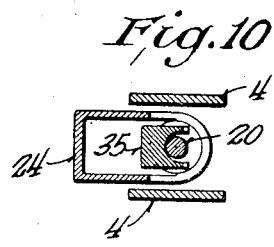
INVENTOR.
WILLIAM O. SCHULTZ
BY
Arthur R. Woolfolk
ATTORNEY.

March 14, 1944.   W. O. SCHULTZ   2,344,113
SWITCH
Filed Jan. 27, 1941   6 Sheets-Sheet 2
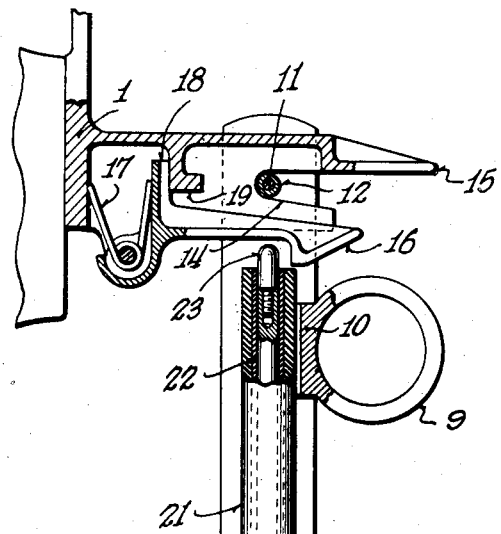
Fig.2
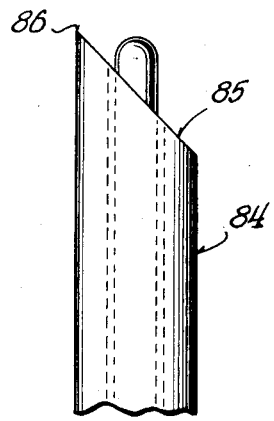
Fig.14
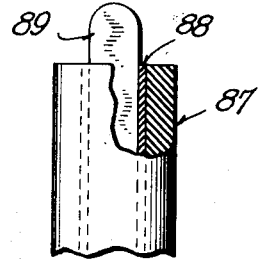
Fig.15
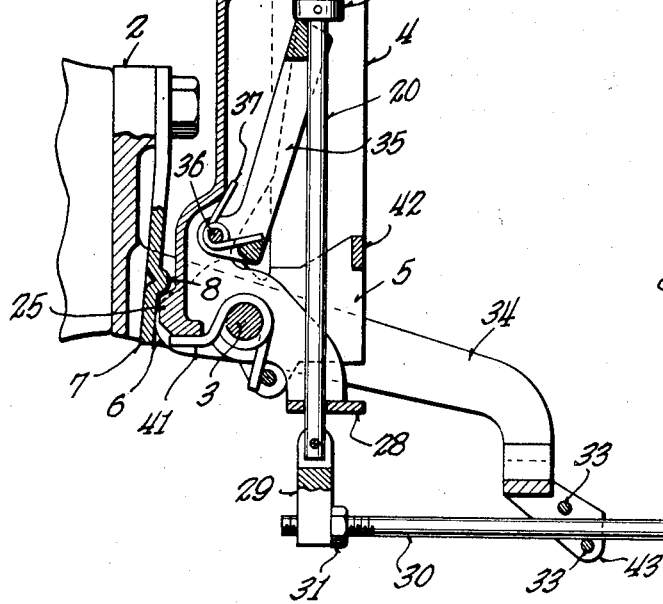
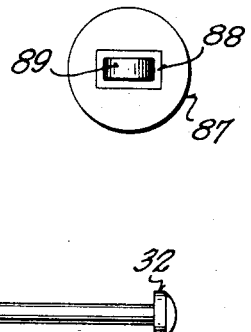
Fig.16
INVENTOR.
WILLIAM O. SCHULTZ
BY Arthur R. Woolfolk
ATTORNEY.

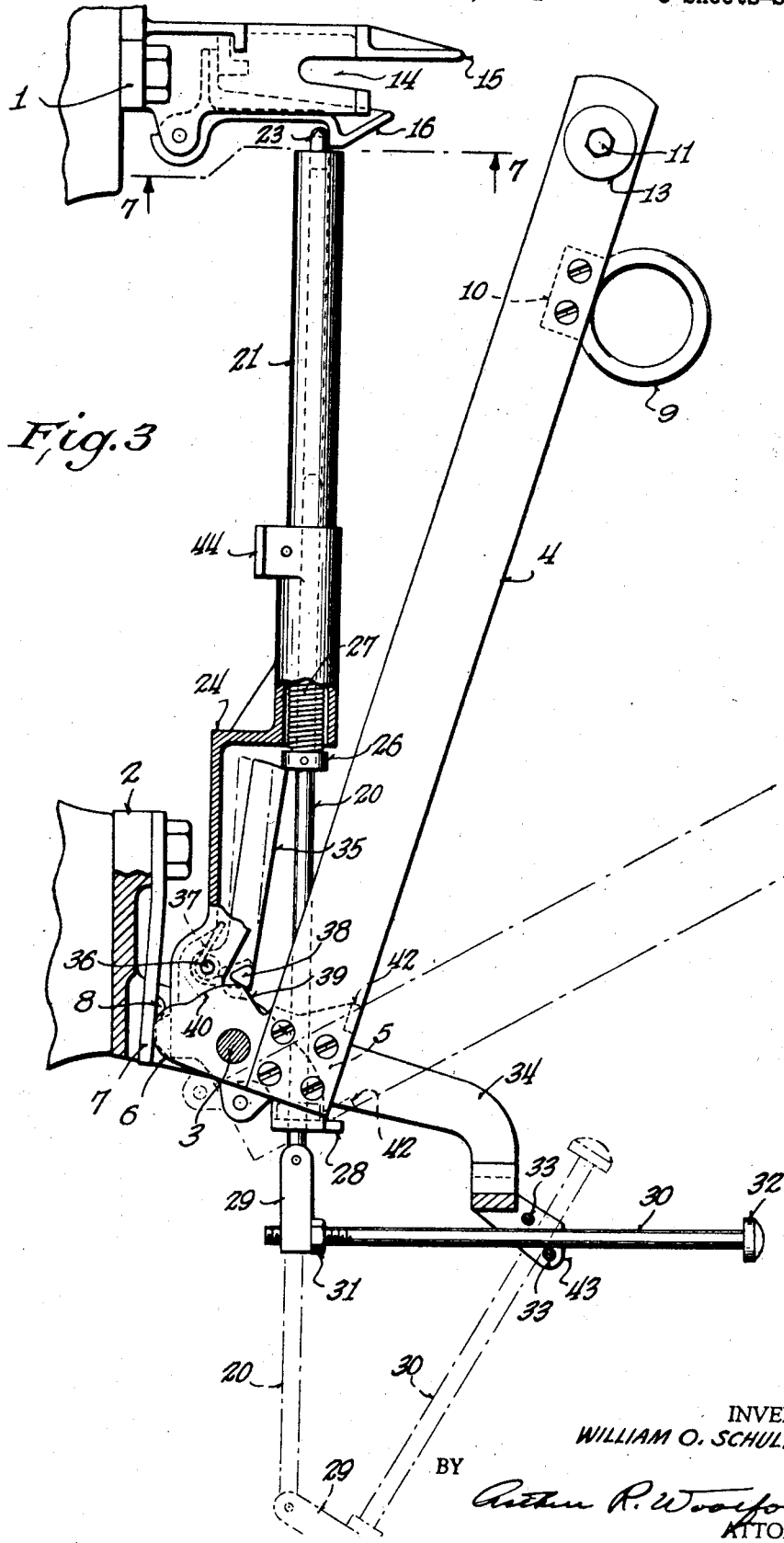

March 14, 1944. W. O. SCHULTZ 2,344,113
SWITCH
Filed Jan. 27, 1941 6 Sheets-Sheet 4

INVENTOR.
WILLIAM O. SCHULTZ
BY
ATTORNEY.

March 14, 1944. W. O. SCHULTZ 2,344,113
SWITCH
Filed Jan. 27, 1941 6 Sheets-Sheet 5
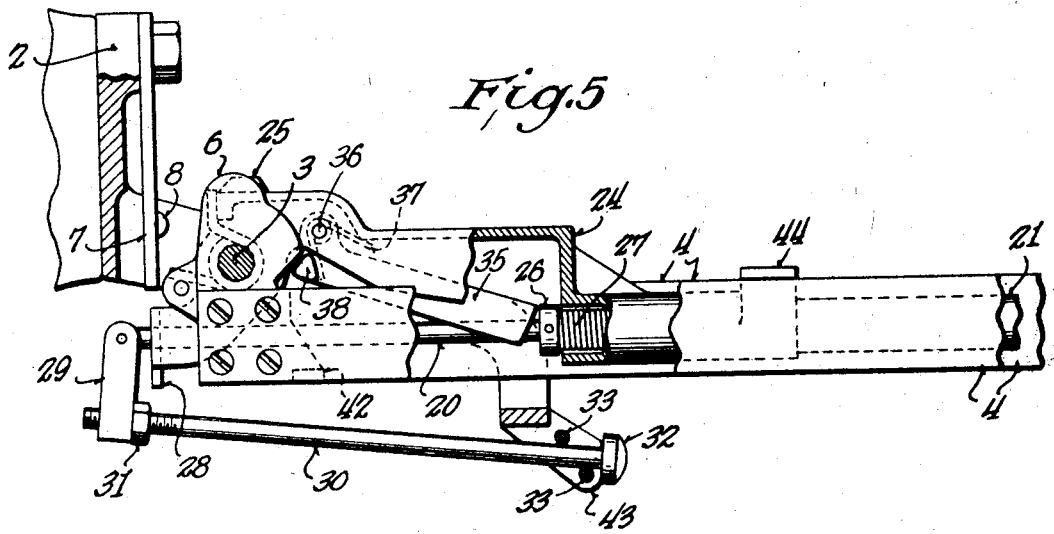
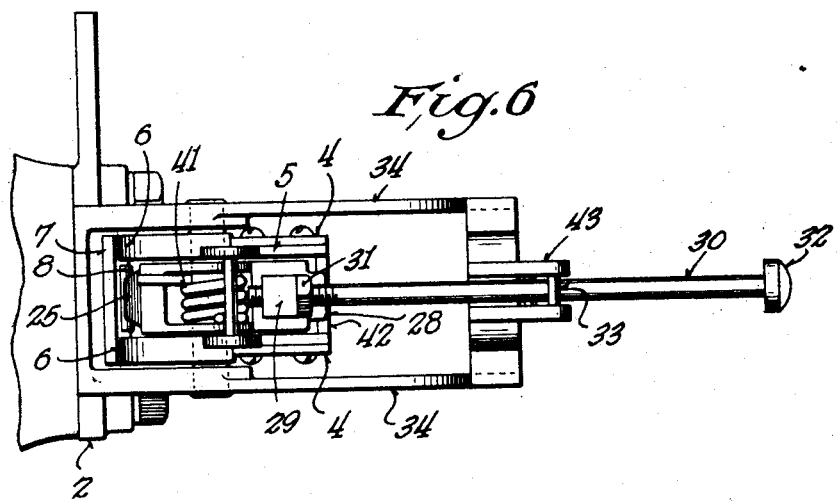
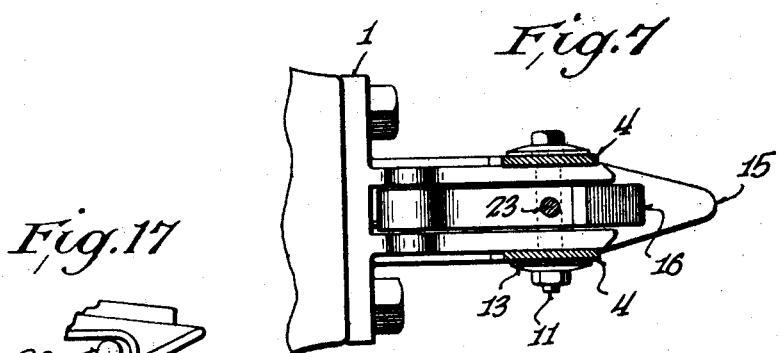
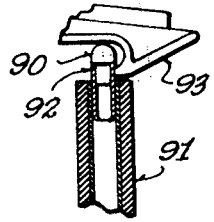
INVENTOR.
WILLIAM O. SCHULTZ
BY
ATTORNEY.

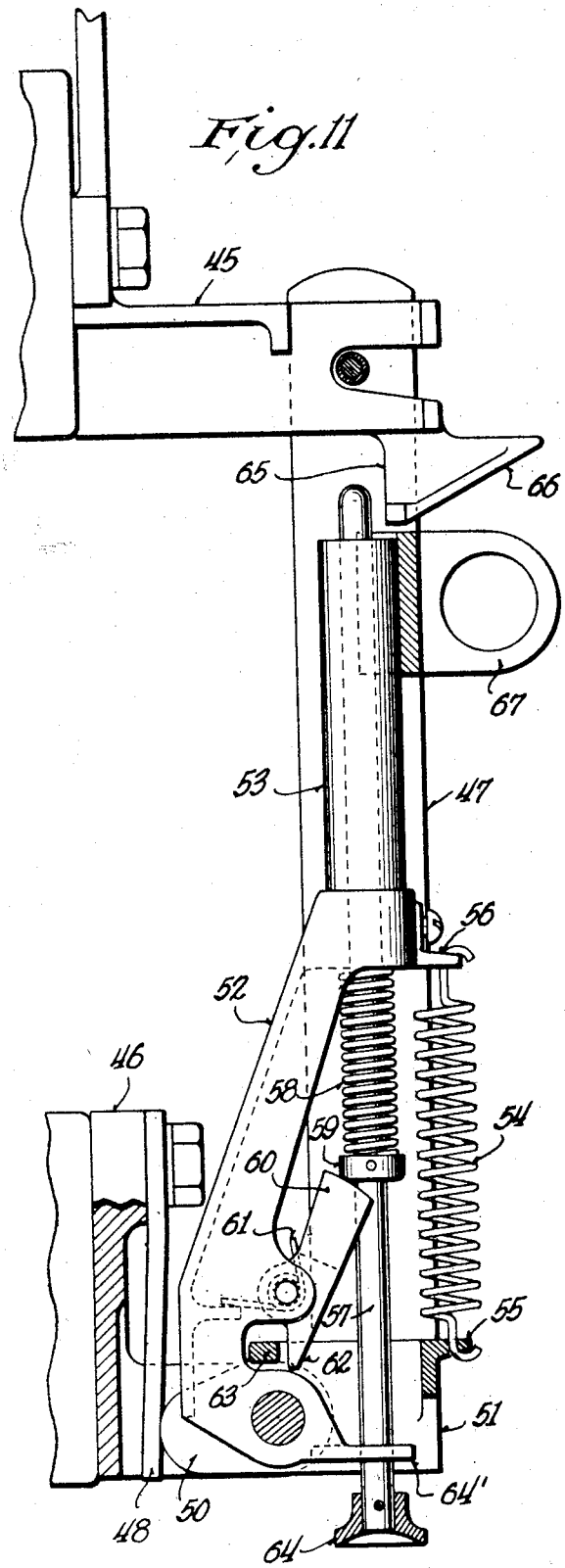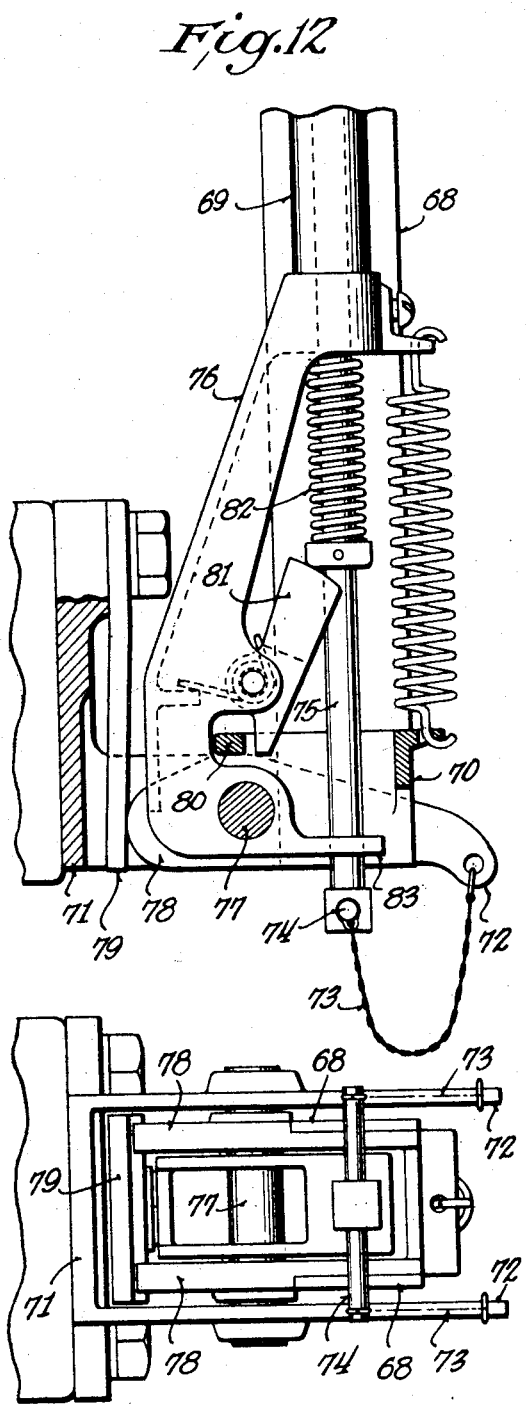

Patented Mar. 14, 1944

2,344,113

UNITED STATES PATENT OFFICE 2,344,113

SWITCH

William O. Schultz, South Milwaukee, Wis., assignor to Line Material Company, South Milwaukee, Wis., a corporation of Delaware Application January 27, 1941, Serial No. 376,052

17 Claims. (Cl. 200—146)

This invention relates to switches and is particularly directed to a switch which is adapted to be opened under load and which may be used in a high tension line if so desired without danger of damage to the switch parts.

In the ordinary type of switches which are used for sectionalizing power lines, standard disconnecting switches are customarily used. These switches are intended to be opened primarily when there is no load on the line. The opening of the line under heavy loads is usually accomplished by an oil break switch. These oil break switches as a rule are located at points which may be remote from the sectionalizing switches and it often becomes highly desirable to quickly open the line at the sectionalizing switch without first opening it at the oil switch.

However, if an attempt is made to open the line by merely opening the standard disconnecting switches, it is very likely that there will be considerable arcing and burning and there is a great possibility that there may be a flashover to ground and a surge produced on the line.

This invention is designed to overcome the above noted defects, and objects of this invention are to provide a novel form of switch which is adapted to be opened under load without damage to the switch parts, which will quickly extinguish any arc that is formed, and which will confine the arc to a predetermined path, and which is so constructed that it will quickly snuff out or blow out the arc.

In greater detail, objects of this invention are to provide a switch which is adapted to be opened under load and which is provided with switch means which are merely pulled open in any convenient manner, and in which an auxiliary or parallel path is formed through a tube having gas-evolving wall material so that when the rod is withdrawn into the tube, the arc is formed in the tube and is extinguished by the evolution of gas within the tube and the throttling action of the tube on the arc so that a very quick extinction of the arc occurs during the opening of the switch without any damage to the switch parts.

Further objects are to provide a switch having the above characteristics which is so made that it may be readily opened and closed by an operator through the medium of an ordinary switch stick if so desired with the assurance that no damage will be occasioned to the switch mechanism or to any associated apparatus, and that no surges or flashovers will be produced.

Further objects are to provide a switch which may be used in place of the ordinary disconnecting switches and which is of relatively simple construction and which is relatively inexpensive to make and does not require the use of an oil switch in connection with the disconnecting switch, but which of itself provides both for the sectionalizing of the line and also for the quick and safe extinguishing of any arc that is formed, thereby preventing flashovers or other damage incident to the opening of the ordinary disconnecting switches under load.

Embodiments of the invention are shown in the accompanying drawings, in which:

Figure 1 is a side elevation of the switch with parts broken away showing the switch in closed position.

Figure 2 is a fragmentary longitudinal sectional view of the switch.

Figure 3 is a fragmentary view showing in full lines the position of the parts when the switch blade has been moved through a portion of its opening stroke and showing in dotted lines the position of the parts when the plunger rod has been tripped.

Figure 5 is a fragmentary view, partly in section, showing the switch in fully open position.

Figure 6 is a bottom view of the structure shown in Figure 1.

Figure 7 is a sectional view on the line 7—7 of Figure 3.

Figure 8 is a sectional view on the line 8—8 of Figure 1.

Figure 9 is a sectional view on the line 9—9 of Figure 1.

Figure 10 is a sectional view on the line 10—10 of Figure 1.

Figure 11 is a view, partly in section, of a modified form of the invention.

Figure 12 is a view, partly in section, of a further modified form of the invention.

Figure 13 is a bottom view of the structure shown in Figure 12.

Figure 14 is a detail showing a further form of tube and rod construction.

Figure 15 is a detail showing another form of tube and rod construction.

Figure 16 is a top view of the structure shown in Figure 15.

Figure 17 is a fragmentary view, partly in section, showing another form of tube and rod construction.

Figure 4:
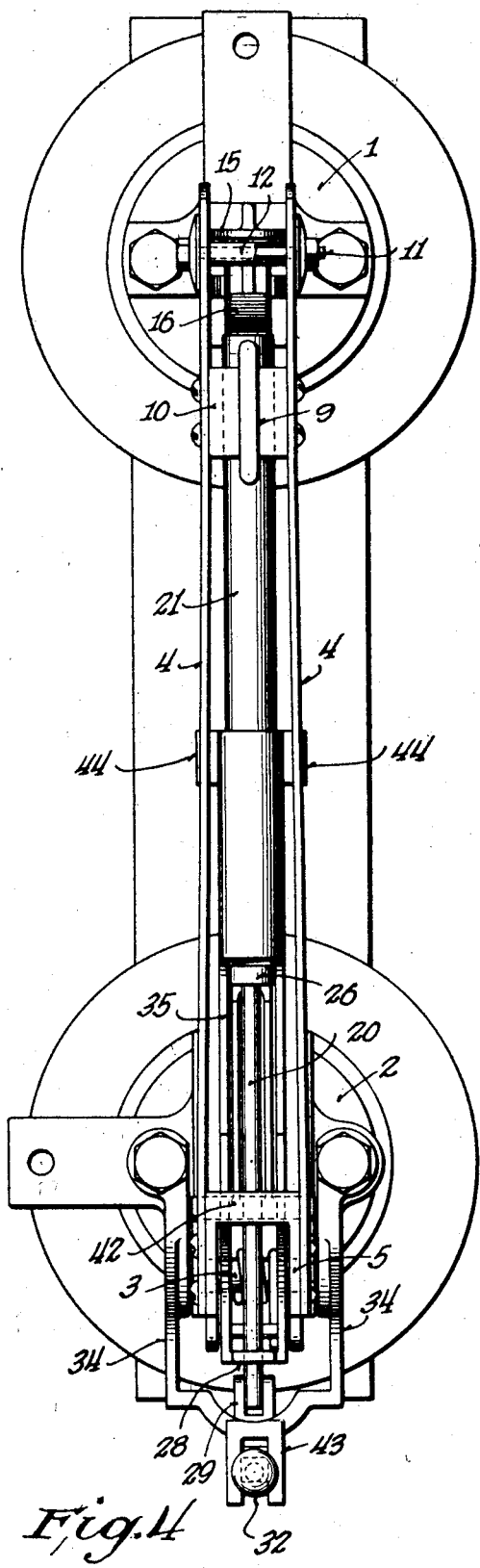
Figure 4 is a front view of the switch.

Referring to the drawings, particularly Figures 1 through 10, it will be seen that the switch comprises a pair of terminals 1 and 2. Usually the switch is mounted in a vertical position as shown wherein the terminal 1 is the upper terminal and the terminal 2 the lower terminal. The invention, however, is not to be so limited as the switch obviously could be mounted in any desired position. The lower terminal 2 constitutes a hinge support and carries a main pintle pin 3 upon which the switch blades and tube hereinafter described are both mounted for independent rotation.

The device is provided with a pair of switch blades 4 which are secured to a casting 5 which is pivoted on the pin 3. This casting 5 is provided with a cam-shaped portion 6 that bears against a relatively heavy contact spring 7, the contact spring being provided with a protuberance or bulge 8 for a purpose hereinafter to appear.

Adjacent the outer end of the switch blades 4 a pull ring 9 or switch manipulating member is provided and is formed so that it has a brace or bridge portion 10 located between the blades. The outer ends of the blades are joined by means of a bolt 11 which passes through a spacer sleeve 12 which determines the minimum spacing of the blades. On the outer side of the blades a pair of spring washers or spring members 13 are provided so as to yieldingly force the blades towards each other so that they will make firm and adequate contact with the upper terminal 1 when the switch is closed.

The upper terminal 1 is provided with a slotted portion 14 within which the bolt 11 and sleeve 12 pass when the switch is closed, as shown most clearly in Figure 2. The switch blades bear against the outer relatively flat surface of the upper terminal 1 and are guided into position by the tapered tongue 15 integral with such upper terminal. The upper terminal is also provided with a latch like contact member 16 which has an outer cam face and an inner shoulder. The member 16 is urged downwardly by means of a spring 17 and is prevented from traveling beyond a predetermined point by the contacting of the lip 18 with the web 19 of the upper terminal 1.

Although the switch is adapted to be used for any desired purpose, it is primarily intended to open a high voltage circuit under load.

In order to accomplish this without damage to the parts, means are provided for forming a shunt or parallel circuit between the upper and lower terminals during the period that the switch blades are being opened and prior to the time that the switch blades leave the upper contact, and to thereafter suddenly interrupt this auxiliary circuit, the invention contemplating also the provision of means for suddenly suppressing or snuffing out the resulting arc without damage to the parts.

The auxiliary circuit is provided by means of a plunger rod 20 which extends through the insulating tube 21 which may be formed of an exterior Bakelite portion and an interior gas-evolving arc extinguishing portion 22, such as fiber, for instance, so that when the arc is formed within the tube as will appear hereinafter, the fiber evolves gas and suddenly blows out or snuffs out the arc. If desired, the rod 20 may be provided with a renewable tip 23.

The tube 21 is carried by a cradle like member or casting 24 which is pivoted upon the pintle pin 3. This casting 24 is provided with a projecting portion 25 which is normally positioned below the protuberance 8 of the heavy contact spring 7 of the lower terminal 2.

The rod is provided with a collar 26 and a compression spring 27 is positioned between the lower end of the tube 21 and the collar 26 and thus biases the rod or plunger 20 downwardly. The casting or member 24 is provided with a transverse apertured rear portion 28 which forms a guide for the lower end of the rod. The lower end of the rod is pivoted to a member 29 into which a restoring arm 30 is screw threaded and locked in adjusted position by means of a nut 31, the arm or rod 30 being provided with an outer headed portion 32. This restoring arm 30 is loosely guided between a pair of pins 33 carried by a projecting structure 34 integral with the lower contact 2.

In order to hold the plunger 20 in the position shown in Figure 2, a spring pressed latch 35 is pivoted as indicated at 36 to the casting 24. The spring for biasing the latch 35 towards latching position is indicated by the reference character 37. The latch 35 is provided with a pair of projections 38 on opposite sides thereof adjacent its pivoted end and these projections cooperate with the relatively flat face 39 of the cam member 6 that is rigid with the switch arms 4, see Figure 3.

It will be seen, therefore, that as the switch arms 4 are pulled outwardly, as shown in full lines in Figure 3, that the flat face 39 engages the projections 38 and rocks the latch 35 to releasing position after the switch blades have been moved outwardly a predetermined distance. Beyond this point the projections 38 ride on the portion 40 of the cam member, see Figure 3, such portion being concentric with the pintle pin 3.

It is to be noted also that spring means are provided which biases the tube 21 towards outward rocking motion. This spring means may take any of many forms, one of which is shown most clearly in Figure 2, and consists of a relatively heavy spring 41 which bears against the casting 24 and biases the tube 21 towards outward rocking motion.

The operation of the apparatus is as follows. When it is desired to open the switch, the operator can freely open it under load and, although it is positioned in a high voltage circuit, without any damage to the parts and without any particular care on the part of the operator. He merely engages the manipulating member or eye 9 with his switch stick and pulls the switch open to the full line position shown in Figure 5. As the switch blades move outwardly, it is apparent that the spring urged tube 21 tries to rock outwardly but is restrained by the engagement of the end of the rod or plunger 20 with the contact member 16 which occurs prior to the time the switch blades leave the upper terminal. This plunger rod forms a circuit paralleling that provided by the switch blades 4 so that when the switch blades leave the upper terminal 1, no arcing occurs as the current is carried by the plunger rod. This is made possible by providing a slight amount of lost motion between the projection 8 and the projection 25. As the switch blades continue their outward motion, the cam faces 39 engage the projections 38 of the latch 35, see Figure 3, and withdraw the latch from engagement with the collar 26 of the plunger rod 29. This allows the spring 27 to suddenly force the plunger 29 downwardly, thus drawing the resulting arc into the fiber lined tube where it is quickly snuffed out by the evolution of gas from the wall material or fiber lining 22 of the tube 21. It is obvious that the entire tube could be formed of fiber if so desired, but it is preferable to have a Bakelite outer shell and a fiber inner lining. Other suitable gas-evolving material could be used for lining the tube 21 if desired.

It is apparent that a quick interruption of the resulting arc occurs and therefore no damage is done to the apparatus.

The tube 21 does not immediately follow the switch blades outwardly but a time delay is provided so that the switch blades move further outwardly during their opening motion prior to the motion of the tube 21 outwardly. This is accomplished by having the projection 25 on the casting 24, see Figure 2, engage beneath the projection 8 on the heavy contact spring 7. This retains the tube 21 in position until some portion of the rear end of the switch blades 4 or casting 5 engage the transverse member 28, see Figure 2.

It is preferable to provide a transverse portion 42 integral with the casting 5 which, as may be seen from Figure 3, engages the member 28 and forces the projection 25 on the casting 24, see Figure 2, to ride over the protuberance 8 of the heavy contact spring 7. When this occurs, the spring 41, see Figure 2, quickly rocks the tube 21 outwardly until it is arrested by the engagement of the ears 44, see Figure 3, with the switch blades 4. The ears 44 take up the force of the blow and do not transmit the force of the blow to the tube 21. If desired, however, the tube 21 may seat beneath the saddle like portion 19 of the eyelet 9, see Figure 8, to further assist in arresting the motion of the tube, though, as stated, the primary if not the total shock is borne by the lips 44 of the casting 24. The primary purpose of the bridge piece or saddle like member 19 of Figure 8 is to assist in centering the tube with reference to the switch blades 4.

During the latter portion of the outward motion of the switch, the head 32 of the restoring rod 30 engages the outward extensions or ears 43 of the projecting portion 34, which portion is rigid with the lower terminal 2, as shown most clearly in Figure 2. In Figure 3 the dotted line position of the parts shows the head 32 of the restoring rod 30 approaching the ears 43 and when it engages the ears, the rod 30 is stopped from further inward motion and thus forces the plunger 20 back to its initial position with respect to the tube 21, as shown in Figure 5, thus restoring the plunger and resetting it as the latch 35 will now move inwardly behind the collar 26, as shown in Figure 5.

When the switch is again closed, the switch blades 4 move as a unit with the tube 21, the upper contact member 19 yielding and allowing the projecting end of the plunger to pass below the member to the original position shown in Figure 2.

The purpose of delaying the outward rocking motion of the tube 21 for an interval after the plunger has moved inwardly of the tube is to insure a dwell or time delay so as to insure the extinguishing of the arc within the tube prior to the rocking of the tube outwardly. This is the preferred operation of the device, though, as will appear hereinafter, the invention contemplates having the tube follow the switch blades 4 outwardly as soon as the plunger is retracted, though, as stated, this is not the preferred form.

It is to be noted from reference to Figure 2 that the casting 24 provides a housing for the spring 27 and at least a partial housing for the latch 35 and other associated mechanisms. This is particularly true when the device is mounted in a vertical or underslung position.

In the form of the invention shown in Figure 11, the upper and lower terminals are indicated by the reference characters 45 and 46 and the switch blades by the reference character 47. The relatively heavy contact spring 48 of the lower terminal is not provided with a protuberance in this form of the invention, but merely engages the cam like member 50 of the casting 51, which casting is rigid with the switch blades. The casting 52 which carries the tube 53 is not provided with any portion corresponding to the protuberance 25, see Figure 2 of the first form of the invention.

Any type of spring means may be provided for any form of the invention for biasing the tubes outwardly. In the form shown in Figure 11, the spring is indicated at 54 and extends between an ear 55 integral with the casting 51 and an ear 56 integral with the casting 52. The plunger rod 57 is urged downwardly by means of the spring 58 and is provided with a collar 59 which is normally engaged by means of the latch 60, such latch being spring biased towards latching position by means of the spring 61. This latch is provided with a lip 62 which overhangs a projecting portion 63 integral with the casting 51.

It is to be noted also that no automatic restoring means are provided in this form of the invention but instead manual means of any desired form may be employed. For example, the lower end of the plunger 57 may be provided with a socketed handle portion or plunger operating member 64 which may be manipulated by the operator to restore the plunger rod, for example by pressing against it with his switch stick after the switch blades 47 have been moved back to closed position. It is preferable to provide a guiding member 64' integral with the casting 52 for guiding the lower end of the plunger rod 57.

The upper terminal is provided with an integral, shouldered contact portion 65 beneath which the end of the plunger rod 57 is adapted to engage. The outer face of the shouldered portion may be cam-shaped as shown at 66 if desired.

When the switch is pulled open by means of the eyelet 67, the end of the plunger 57 engages the stationary contact 65 before the switch blades leave the upper terminal 45. Continued motion of the switch blades trips the plunger 57 and the plunger is retracted into the tube 53 and the tube immediately swings outwardly.

When the switch is again closed, the plunger is not automatically restored as in the first form of the invention but has to be manually restored by pressing upwardly on its manipulating portion 64 to force it upwardly to its latched position.

It is to be distinctly understood that any of the parts of any one of the forms of the invention disclosed herein may be used wherever desired with any other form of the invention.

In the form of the invention shown in Figures 12 and 13 a different type of restoring device has been disclosed. In this form of the invention the switch blades are indicated by the reference character 68, the tube by the reference character 69, and the casting rigid with the switch blades by the reference character 70. The lower terminal 71 is provided with integral extensions 72 in the form of outwardly projecting ears to which chains 73 are attached. These chains are also attached to a cross-bar 74 which is rigidly carried by the lower end of the plunger rod 75.

The tube 69 is carried by the casting 76 which, together with the casting 70, are independently pivoted on the pintle pin 77 carried by the lower contact. The casting 70 is provided with a cam-shaped contact member 78 adapted to engage the relatively heavy contact spring 79. The casting 70 is also provided with the trip portion 80 which is adapted to trip the latch 81 to release the plunger rod 75 so that the spring 82 may force the plunger rod downwardly for the final interruption of the circuit as hereinbefore described. It is to be noted that the casting 76 is provided with an ear 83 for guiding the lower end of the plunger rod 75.

In this form of the invention when the switch blades are drawn outwardly, the plunger rod 75 operates in exactly the same manner as the plunger rod 57 as described in connection with Figure 11. However, the plunger rod is restored to its initial position with reference to the tube 69 because during the final portion of the opening stroke of the switch blades 68, the chains 73 will be tightened and will force the plunger rod 75 back to its latched position with reference to the tube 69. In this form of the invention it is contemplated using a spring pressed latch like contact member corresponding to the member 16 of Figure 2 so that the combined switch blade and tube may be moved to closed position, the member corresponding to the member 16 allowing the end of the plunger rod to pass beneath its shouldered portion as described in connection with Figure 2. It is also intended with this form of the invention that an eye member corresponding to the eye member 9 of Figure 2 or the eye member 67 of Figure 11 be provided so that it may be manipulated from a switch stick and may also engage the tube when the switch blades are moved to closed position in exactly the same way the structures shown in Figures 2 and 11 operate. If desired, the casting 76 could also be provided with projecting feet corresponding to those shown at 44 in Figures 3 and 4.

The tube may be cut on a slant at its end as shown in Figure 14. For example, the tube is indicated at 84 and the slanting outer face is indicated at 85. This slanting outer face provides a corner portion 86 which acts in the nature of a barrier so that if the arc has persisted past the time that the tube 84 starts to move outwardly, this corner portion 86 will act as a barrier to further assist in interrupting the arc.

In all forms of the invention the tubes are intended to be either composed of a gas-evolving material thhroughout, or else are to be lined, as previously described, with a gas-evolving material such as fiber.

In the form of the invention shown in Figures 15 and 16, the tube 87 is provided with a rectangular opening which is lined with a rectangular fiber lining indicated by the reference character 88. In this form of the invention the plunger rod is rectangular as indicated at 89. The purpose of this construction is to provide a greater surface of gas-evolving material by the use of the rectangular fiber tube.

From the description thus far given, it will be seen that the preferred form provides a time delay means for delaying the outward rocking of the tube for an interval after the plunger rod has been reciprocated. This form is the preferred form.

However, it has also been shown that the device can operate without the use of this time delay for delaying the outward motion of the tube after the plunger rod has reciprocated. Though this is not the preferred form, it will function satisfactorily in many cases. However, for excessively heavy loads the preferred first form of the invention is more satisfactory as it provides a definite interval between the time the plunger rod reciprocates and the time the tube rocks outwardly.

It is therefore to be understood that any of the several forms of the invention may be provided with means for delaying the outward swing of the tube for an interval after the plunger rod has operated, or may be used without the delay means. Also, any form of reset means can be used with any form of the invention as well as any form of tube and rod construction. Also, the plunger rod could be solid or tubular and may or may not be provided with a removable tip.

In addition to this, the plunger rod may be provided with a fiber tip as indicated at 90 in the form shown in Figure 17. In this form of the invention the tube is indicated at 91, the plunger rod at 92, and the upper latch like contact at 93. This upper contact is intended to be pivoted and spring urged as has been described in connection with Figure 2. In the form of the invention shown in Figure 17, the metallic plunger rod 92 contacts with the metallic downwardly hanging lip of the member 93. The fiber tip is spaced inwardly of the lip under normal conditions, that is to say, when the switch is in closed position. The switch operates in the manner hereinbefore described, either with or without a time delay for the main tube 91. However, when the plunger rod is reciprocated, the fiber tip 90 also enters the arc and serves to assist in extinguishing it. In addition to this, the fiber tip 90 moves into the tube 91, such tube being lined with fiber as previously described, and thus there is somewhat of a throttling action occurring in addition to those heretofore described. If desired, the plunger rod 92 may be a hollow metal tube within which the reduced shank of the fiber tip 90 may be inserted.

Figure 18:
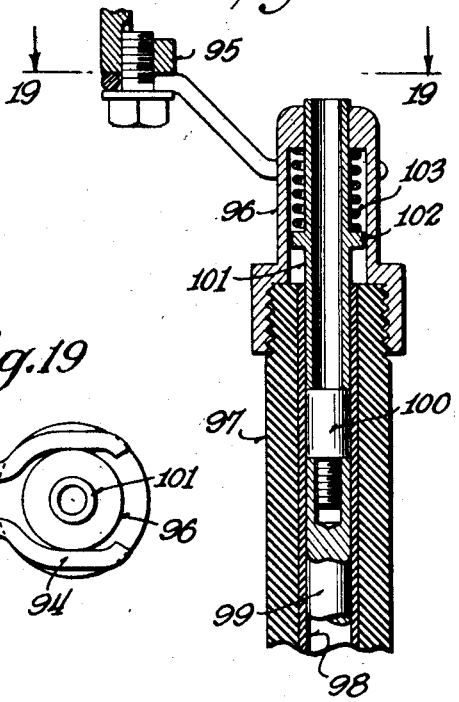
Figure 18 is a fragmentary detail sectional view showing a further form of tube and rod construction and a further form of delay means.
Figure 19:
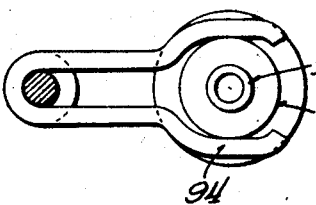
Figure 19 is a sectional view on the line 19—19 of Figure 18.

The time delay means for delaying the outward motion of the pivoted tube may take other forms. For example as shown in Figures 18 and 19, this time delay may be provided by the frictional grip of a pair of contact spring arms 94 carried by the upper terminal 95. These spring arms may embrace and slightly overhang a reduced tubular metal extension 96 screwed or otherwise secured to the outer end of the insulating tube 97, such tube being lined with fiber as indicated at 98.

The plunger rod in this form of the invention is indicated at 99 and is provided with a removable tip 100 which normally contacts an inwardly projecting tubular metal member 101 projecting into the outer end of the insulating tube and guided by the outer end of the metal contact 36. This metal tube 101 is provided with a shoulder 102 against which a spring 103 bears. When the switch blades, not shown, are moved outwardly as in any of the previously described forms of the invention, the tube 97 is prevented from moving outwardly by the engagement of the spring contact arms 94 with the tubular metal portion 96. When the plunger rod 99 is suddenly reciprocated downwardly, separation occurs wholly within the tube, that is to say, between the tip 100 of the plunger rod and the tubular portion 101. The gases evolved are vented through the tubular portion 101. The shouldered portion 102 prevents the metal tube 101 from following the plunger rod downwardly except to a very limited extent.

Figure 20:
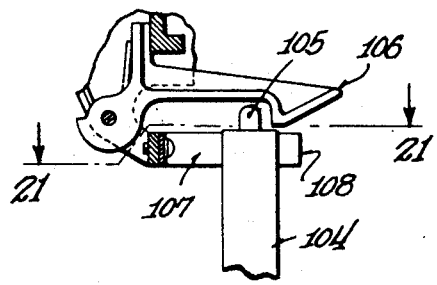
Figure 20 is a detail showing a further form of delay means.
Figure 21:
Figure 21 is a fragmentary view taken approximately on the line 21—21 of Figure 20.

A further form of time delay means is shown in the form of the invention illustrated in Figures 20 and 21. In this form of the invention the insulating tube is indicated at 104 and the plunger rod at 105. This plunger rod may correspond to that described in connection with Figure 2 for instance, and the insulating tube may, as previously described, be fiber lined.

The latch like contact 106 is spring pressed and normally is engaged by the projecting portion of the plunger rod 105 when the switch arms, not shown, are moved outwardly. However, the spring arms 107 frictionally grip the tube 104 and are provided with inturned ends 108 which tend to engage the outer side of the tube and thus delay its opening until the tube is urged outwardly. In either of the frictional grip time delay devices shown in Figures 18, 19 and 20, 21, the fuse tube may be moved outwardly by any of the means hereinbefore described. Its initial movement outwardly may be caused by the mechanical interengaging of parts of the mechanism as described in connection with Figure 2, or may be caused merely when the spring biasing the tube outwardly overpowers the frictional grip devices.

These frictional grip devices are not the preferred form of the invention for accomplishing the time delay. The time delay is accomplished with greater precision by means of the mechanical interlocking time delay structure as described in connection with the first form of the invention and specifically as indicated at 25 and 8 of Figure 2.

It will be seen that a novel form of switch has been shown which is adapted to be opened under load conditions and may be positioned in a high tension line. This switch has all of the desirable features of a disconnecting switch and in addition to that has the novel features of providing a switch which may be opened under load conditions without danger to the switch parts by drawing the arc into an arc extinguishing insulating tube to quickly interrupt the circuit formed through the parallel path of the plunger rod.

The switch has a great many uses among which may be mentioned its use as a sectionalizing switch for a high tension line. This switch, therefore, can be operated as an ordinary disconnecting switch, which usual types of switches are not adapted to be opened under load, and in addition to this may be opened under load with assurance that no damage will be done to the switch mechanism.

While a single disconnecting switch has been shown for each of the several different forms of the invention, it is obvious that these switches may be operated as gang switches. For example, on a three-phase system all three of the switches may be connected together for simultaneous operation. It is obvious that the operating means, or any suitable operating means, for opening and closing the switches, may all be connected together so that all of the switches may be simultaneously operated where a gang switch construction is employed. It is intended, therefore, that the claims cover the invention whether a single switch is used, or whether such switch appears as one of a group of switches for gang operation.

Although this invention has been described in considerable detail, it is to be understood that such description is intended as illustrative rather than limiting, as the invention may be variously embodied and is to be interpreted as claimed.

I claim:

1. A switch adapted to be opened under load comprising two terminal members, switch means for connecting and disconnecting said terminal members by movement to closed and open position respectively, means for moving said switch means, an insulating tube, plunger means within said tube for maintaining said terminal members in electrical connection with each other for an interval after said switch means has moved to open position, means for bodily moving said plunger means within said tube after said switch means has moved to open position for interrupting the connection between said terminal members and causing the first arc to be extinguished within said tube, means for moving said tube outwardly after said plunger means has operated, mechanism for restoring said plunger means to its initial position while said tube is in its outer position, and means for moving said tube to its original position when said switch means is moved to closed position.

2. A switch adapted to be opened under load comprising two terminal members, switch means for connecting and disconnecting said terminal members by movement to closed and open position respectively, an insulating tube normally located between said terminal members and movable outwardly, plunger means within said tube for maintaining said terminal members in electrical connection with each other for an interval after said switch means has moved to open position, means for bodily moving said plunger means within said tube after said switch means has moved to open position for interrupting the connection between said terminal members and causing the final arc to be extinguished within said tube, means for moving said insulating tube outwardly after said plunger means has operated, and means for delaying the outward motion of said insulating tube for an interval after said plunger means has operated.

3. A switch adapted to be opened under load comprising two terminal members, switch means for connecting and disconnecting said terminal members by movement to closed and open position respectively, switch operating means for moving said switch means, a movably mounted insulating tube normally positioned between said terminal members, plunger means within said tube for maintaining said terminal members in electrical connection with each other for an interval after said switch means has moved to open position, means for reciprocating said plunger means within said tube after said switch means has moved to open position for interrupting the connection between said terminal members and causing the final arc to be extinguished within said tube, automatic means for moving said tube outwardly after said plunger means has been reciprocated, means for delaying the outward motion of said tube for an interval after said plunger means has operated, and means for operatively connecting said switch means and tube for moving said tube back to its original position between said terminal members when said switch means is moved to closed position.

4. A switch adapted to be opened under load comprising two terminal members, switch means for connecting and disconnecting said terminal members by movement to closed and open position respectively, switch operating means for moving said switch means, a movably mounted insulating tube normally positioned between said terminal members, plunger means within said tube for maintaining said terminal members in electrical connection with each other for an interval after said switch means has moved to open position, means for reciprocating said plunger means within said tube after said switch means has moved to open position for interrupting the connection between said terminal members and causing the final arc to be extinguished within said tube, automatic means for moving said tube outwardly after said plunger means has been reciprocated, means for operatively connecting said switch means and tube for moving said tube back to its original position between said terminal members when said switch means is moved to closed position, and plunger restoring means for restoring said plunger means to its initial position with respect to said tube while said tube is in its outer position.

5. A switch adapted to be opened under load comprising two terminal members, switch means for connecting and disconnecting said terminal members by movement to closed and open position respectively, switch operating means for moving said switch means, a movably mounted insulating tube normally positioned between said terminal members, plunger means within said tube for maintaining said terminal members in electrical connection with each other for an interval after said switch means has moved to open position, means for reciprocating said plunger means within said tube after said switch means has moved to open position for interrupting the connection between said terminal members and causing the final arc to be extinguished within said tube, automatic means for moving said tube outwardly after said plunger means has been reciprocated, means for operatively connecting said switch means and tube for moving said tube back to its original position between said terminal members when said switch means is moved to closed position, and automatically acting plunger restoring means for restoring said plunger means to its initial position with respect to said tube while said tube is in its outer position.

6. A switch adapted to be opened under load comprising two terminal members, switch means for connecting and disconnecting said terminal members by movement to closed and open position respectively, an insulating tube, plunger means within said tube for maintaining said terminal members in electrical connection with each other for an interval after said switch means has moved to open position, spring means permanently biasing said plunger means towards motion to interrupt the electrical connection between said terminal members, latch means for normally holding said plunger means against motion within said tube after said switch means has been moved to open position, means operated from said switch means for tripping said latch means, whereby said plunger means will move within said tube to interrupt the connection between said terminal members and cause the final arc to be extinguished within said tube, and means for moving said tube outwardly towards said switch means after said plunger means has operated.

7. A switch adapted to be opened under load comprising two terminal members, switch means for connecting and disconnecting said terminal members by movement to closed and open position respectively, means for moving said switch means, an insulating tube, plunger means within said tube for maintaining said terminal members in electrical connection with each other for an interval after said switch means has moved to open position, means for bodily moving said plunger means within said tube after said switch means has moved to open position for interrupting the connection between said terminal members and causing the final arc to be extinguished within said tube, means for moving said tube outwardly after said plunger means has operated, and means for delaying the outward motion of said tube after said plunger means has operated until said switch means has arrived at substantially a predetermined position during the opening movement of said switch means.

8. A switch adapted to be opened under load comprising two terminal members, switch means for connecting and disconnecting said terminal members by movement to closed and open position respectively, means for moving said switch means, an insulating tube, plunger means within said tube for maintaining said terminal members in electrical connection with each other for an interval after said switch means has moved to open position, means for bodily moving said plunger means within said tube after said switch means has moved to open position for interrupting the connection between said terminal members and causing the final arc to be extinguished within said tube, means for moving said tube outwardly after said plunger means has operated, and means for delaying the outward movement of said tube for an interval after said plunger means has operated.

9. A switch adapted to be opened under load comprising two terminal members, switch means for connecting and disconnecting said terminal members by movement to closed and open position respectively, means for moving said switch means, an insulating tube, plunger means within said tube for maintaining said terminal members in electrical connection with each other for an interval after said switch means has moved to open position, means for bodily moving said plunger means within said tube after said switch means has moved to open position for interrupting the connection between said terminal members and causing the final arc to be extinguished within said tube, means operated from said switch means for moving said tube outwardly, and means for restoring said plunger means to its original position with reference to said tube while said tube is in its outer position.

10. A switch adapted to be opened under load comprising a terminal member provided with pivot means, a second terminal member, switch means pivoted on said pivot means and adapted to engage said second terminal member, means for moving said switch means to open and closed position, an insulating tube pivotally mounted on said pivot means and having an open end normally positioned adjacent said second terminal member, plunger means within said tube projecting from the open end thereof, said second terminal member having plunger engaging means for engaging said plunger means for an interval after said switch means has moved to open position, means for withdrawing said plunger means from said plunger engaging means into said tube when said switch means has executed a predetermined part of its opening stroke, means independent of said plunger means for temporarily holding said tube against outward motion, and means for subsequently rocking said tube outwardly.

11. A switch adapted to be opened under load comprising a terminal member provided with pivot means, a second terminal member, switch means pivoted on said pivot means and adapted to engage said second terminal member, means for moving said switch means to open and closed position, an insulating tube pivotally mounted on said pivot means and having an open end normally positioned adjacent said second terminal member, plunger means within said tube projecting from the open end thereof, said second terminal member having plunger engaging means for engaging said plunger means for an interval after said switch means has moved to open position, means for withdrawing said plunger means from said plunger engaging means into said tube when said switch means has executed a predetermined part of its opening stroke, means for subsequently rocking said tube outwardly, and means for automatically projecting said plunger means outwardly from the open end of said tube after said tube has rocked outwardly a predetermined distance and while said tube is in its outer position.

12. A switch adapted to be opened under load comprising contact means, movable switch means adapted to be moved into and out of engagement with said contact means, a tube of insulating material having an outer end adjacent said contact means, a conducting plunger within said tube for maintaining contact engagement with said contact means after said switch means has been moved away from said contact means, means for suddenly reciprocating said plunger within said tube out of engagement with said contact means after said switch means has been moved away from said contact means, said tube having its outer end adjacent said contact means bevelled to provide a barrier-like portion, and means for moving said tube outwardly after said plunger has operated.

13. A switch adapted to be opened under load comprising two terminal members, switch means for connecting and disconnecting said terminal members by movement to closed and open position respectively, means for moving said switch means, an insulating tube, plunger means within said tube for maintaining said terminal members in electrical connection with each other for an interval after said switch means has moved to open position, means for bodily moving said plunger means within said tube after said switch means has moved to open position for interrupting the connection between said terminal members and causing the final arc to be extinguished within said tube, means operated from said switch means for moving said tube outwardly, and restoring means including link mechanism for restoring said plunger means to its original position with reference to said tube after said tube has moved outwardly.

14. A switch adapted to be opened under load comprising two terminal members, switch means for connecting and disconnecting said terminal members by movement to closed and open position respectively, means for moving said switch means, an insulating tube, plunger means within said tube for maintaining said terminal members in electrical connection with each other for an interval after said switch means has moved to open position, means for bodily moving said plunger means within said tube after said switch means has moved to open position for interrupting the connection between said terminal members and causing the final arc to be extinguished within said tube, means operated from said switch means for moving said tube outwardly, and restoring means including a freely flexible connector for restoring said plunger means to its original position with reference to said tube after said tube has moved outwardly.

15. A switch adapted to be opened under load comprising two terminal members, switch means for connecting and disconnecting said terminal members by movement to closed and open position respectively, means for moving said switch means, an insulating tube, plunger means within said tube for maintaining said terminal members in electrical connection with each other for an interval after said switch means has moved towards open position, means for bodily moving said plunger means within said tube after said switch means has moved towards open position to a first predetermined position for interrupting the connection between said terminal members and causing the final arc to be extinguished within said tube, means biasing said tube towards outward motion, interengaging means temporarily holding said tube against outward motion after said plunger means has operated, and means operated from said switch means for positively insuring the outward movement of said tube when said switch means has reached a second predetermined position in its opening movement.

16. A switch adapted to be opened under load comprising two terminal members, switch means for connecting and disconnecting said terminal members by movement to closed and open position respectively, means for moving said switch means, an insulating tube, plunger means within said tube for maintaining said terminal members in electrical connection with each other for an interval after said switch means has moved towards open position, means for bodily moving said plunger means within said tube after said switch means has moved towards open position for interrupting the connection between said terminal members and causing the final arc to be extinguished within said tube, biasing spring means for biasing said tube towards outward motion, yielding gripping means for yieldingly holding said tube against outward motion against the action of said biasing means, and means operated from said switch means for forcing said tube towards open position against the action of said yielding gripping means.

17. A switch adapted to be opened under load comprising two terminal members, switch means for connecting and disconnecting said terminal members by movement to closed and open position respectively, means for moving said switch means, an insulating tube having a terminal normally electrically connected to one of said terminal members and having a hollow conductor extending from the terminal of said tube into said tube, plunger means within said tube normally engaging said hollow conductor and forming a conducting path between said terminal members for an interval after said switch means has moved towards open position, means for bodily moving said plunger means within said tube away from said hollow conductor after said switch means has moved a predetermined distance towards open position for interrupting the circuit wholly within said tube, means for moving said tube outwardly after said plunger means has operated, and means for delaying the outward movement of said tube for an interval after said plunger means has operated.

WILLIAM O. SCHULTZ.